Patented Oct. 2, 1923.

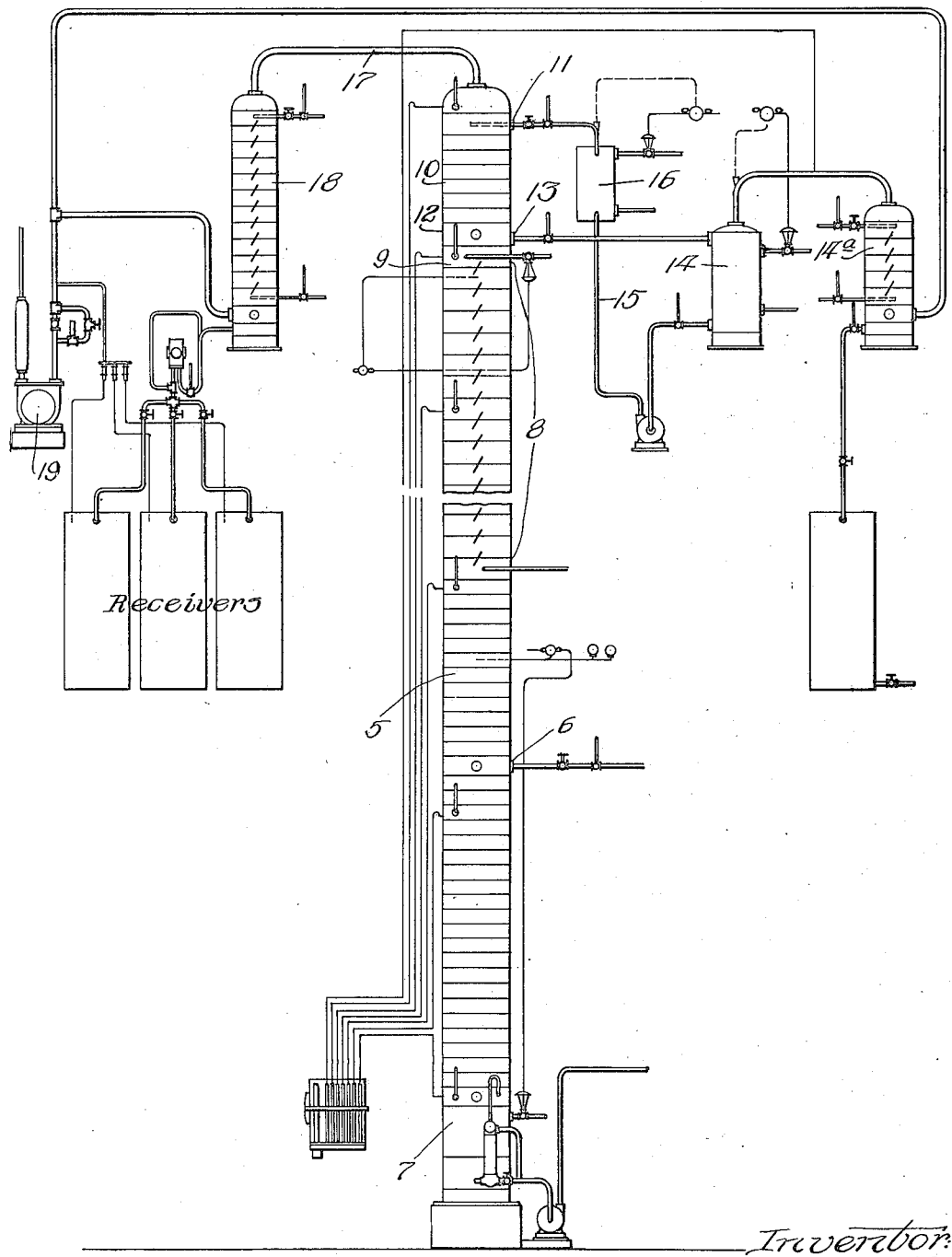

1,469,447

UNITED STATES PATENT OFFICE.

JOSEPH SCHNEIBLE, OF CHICAGO, ILLINOIS.

ABSOLUTE ALCOHOL.

Application filed October 30, 1922. Serial No. 597,837.

*To all whom it may concern:*

Be it known that I, JOSEPH SCHNEIBLE, a citizen of the United States, residing at Chicago, in the county of Cook and State of Illinois, have invented a new and useful Improvement in Absolute Alcohol, of which the following is a specification.

This invention relates to the manufacture by distillation of absolute alcohol and will be fully understood by reference to the following description and accompanying illustrative drawing in which apparatus for carrying out the invention is shown diagrammatically and partly in elevation.

In accordance with this invention suitable distilling material produced by fermentation is continuously introduced into the column 5 at an inlet point 6 at an intermediate position in the column, distillation being effected by a suitable heating medium, e. g., steam, introduced into the heater 7 at the base of the column. The distillation and rectification of the alcohol is effected in the still continuously and under subatmospheric pressure, preferably as shown in my prior application Serial No. 433376, filed December 27, 1920. The rectification of the alcohol takes place in the cooled section of the column designated by the numeral 8. The rectification may be carried to any desired concentration of alcohol up to the constant boiling point mixture of alcohol and water in operating at pressures under which such mixtures exist, or to any desired alcohol concentration at lower pressures.

The rectified alcohol vapors pass from the cooled section 8 of the column at a point 9, at which their temperature is substantially constant and slightly below the theoretical temperature of a saturated vapor of the same composition at the existing pressure, and enter a section 10 through which they pass in counter-current to a spray of glycerine or equivalent material introduced through line 11. The glycerine is introduced at a temperature below the boiling point of water under the prevailing conditions and such that it is withdrawn from the section 10 by means of a cut-out plate 12 and line 13 while at a temperature somewhat above that of the alcohol vapors entering the section 10. The glycerine withdrawn passes into a concentrator 14 which is also under subatmospheric pressure, and it is therein heated for the removal of at least the greater proportion of its water contents. The water removed is condensed in a suitable condenser 14ª. The glycerine is then forced through line 15 into an attemperator 16 in which it is cooled to the temperature at which it is to be introduced into the still section 10.

The alcohol vapors, substantially free from water, pass out of still section 10 through line 17 to a condenser 18, to which is connected a vacuum pump 19, by which a suitable pressure may be maintained throughout the system.

The proportion of glycerine employed is sufficient to effect absorption of the water present in the alcohol without exceeding 20% concentration. Preferably sufficient is used so that its water concentration on withdrawal from the still section 10 will be about 5%.

As a specific example of the process, the still may be operated with a pressure at the point of entry of the vapors into the still section 10 of 75 mm., the temperature at this point being approximately 30° C., varying slightly with the proportion of permanent gas present. With any given distilling material, it will be substantially constant. The glycerine is introduced into the still section 10 at about 35° C. and is withdrawn therefrom at about 32° C. In the concentrator 14 it is heated to about 46 to 48° C. under the same pressure (75 mm.), the absorbed water being thereby removed. In the attemperator 16 it is again suitably cooled for re-introduction into the still section 10. Substantially absolute alcohol vapors are removed from still section 10 and are condensed.

I claim:

1. In a distillation process, the method of producing dehydrated alcohol which consists in passing alcohol vapors into intimate contact with glycerine at a temperature above the temperature of said vapors, removing the dehydrated alcohol vapors and separately removing the glycerine.

2. In a distillation process, the method of continuously producing dehydrated alcohol which consists in subjecting alcohol vapors under subatmospheric pressure to intimate contact with glycerine at a temperature above the temperature of the vapors, and removing the dehydrated alcohol vapors.

3. The method of producing absolute alcohol by distillation, which consists in continuously distilling an alcohol containing material, rectifying the evolved alcohol containing vapors commingling the rectified alcohol vapors with glycerine at a temperature higher than that of the rectified alcohol vapors, thereby removing water therefrom and separating the dehydrated alcohol vapors.

4. The method of continuously producing absolute alcohol by distillation, which consists in continuously distilling an alcohol containing material, rectifying the evolved alcohol containing vapors, commingling the rectified alcohol vapors with glycerine at a temperature above that of the rectified alcohol vapors, thereby removing water therefrom, separating the dehydrated alcohol vapors and maintaining a subatmospheric pressure upon the vapors throughout the operation.

5. The method of continuously producing dehydrated alcohol by distillation, which consists in continuously distilling an alcohol containing material, rectifying the evolved alcohol containing vapors commingling the rectified alcohol vapors with glycerine at a temperature above that of the rectified alcohol vapors and materially below the boiling point of water, thereby removing water from said vapors, separating the dehydrated alcohol vapors.

6. The method of continuously producing dehydrated alcohol by distillation, which consists in continuously distilling an alcohol containing material, rectifying the evolved alcohol containing vapors commingling the rectified alcohol vapors with glycerine at a temperature above that of the rectified alcohol vapors and materially below the boiling point of water, thereby removing water from said vapors, separating the dehydrated alcohol vapors while maintaining sub-atmospheric pressure throughout the operation.

JOSEPH SCHNEIBLE.